US012705558B2

(12) United States Patent
Hayot et al.

(10) Patent No.: US 12,705,558 B2
(45) Date of Patent: Aug. 11, 2026

(54) METHOD AND SYSTEM FOR IDENTIFYING AN OPTIMISED INTERNET CONNECTIVITY CONFIGURATION

(71) Applicant: SITA Switzerland SÀRL, Cointrin (CH)

(72) Inventors: Laurent Hayot, Cointrin (CH); Yves Henri Grandchamp, Cointrin (CH); Hugo Pierre Rodolphe Frammery, Cointrin (CH); Pierre-Yves Benain, Cointrin (CH)

(73) Assignee: SITA Switzerland SARL, Geneva (CH)

( * ) Notice: Subject to any disclaimer, the term of this patent is extended or adjusted under 35 U.S.C. 154(b) by 448 days.

(21) Appl. No.: 18/247,126

(22) PCT Filed: Sep. 29, 2021

(86) PCT No.: PCT/EP2021/076874
§ 371 (c)(1),
(2) Date: Mar. 29, 2023

(87) PCT Pub. No.: WO2022/069592
PCT Pub. Date: Apr. 7, 2022

(65) Prior Publication Data

US 2024/0025545 A1 Jan. 25, 2024

(30) Foreign Application Priority Data

Sep. 30, 2020 (EP) .................................... 20199440

(51) Int. Cl.
*G06Q 10/0631* (2023.01)

(52) U.S. Cl.
CPC .............................. *G06Q 10/06315* (2013.01)

(58) Field of Classification Search
CPC ..... G06Q 10/06315; G06N 3/045; G06N 5/01
See application file for complete search history.

(56) References Cited

U.S. PATENT DOCUMENTS 6,154,767 A * 11/2000 Altschuler .......... G06F 16/9574 709/216
8,352,392 B2 1/2013 Swift et al.
(Continued)

FOREIGN PATENT DOCUMENTS

CN 109495317 A * 3/2019 ........... H04L 41/145
CN 109816579 A * 5/2019
(Continued)

OTHER PUBLICATIONS

International Preliminary Report on Patentability for International Application No. PCT/EP2021/076874, mailed Apr. 13, 2023, 9 Pages.
(Continued)

*Primary Examiner* — Redhwan K Mawari
(74) *Attorney, Agent, or Firm* — Bradley Arant Boult Cummings LLP; Daniel E. Sineway, Esq.; Adam J. Thompson, Esq.

(57) ABSTRACT

There is provided a system and methods for identifying an optimised internet connectivity configuration. The system comprises a processing module configured to process received data and a processor that calculates outcome values for each of a plurality of indicators associated with in-flight internet connectivity. Each outcome value is calculated using received data, a trained machine learning model, and a set of features associated with the corresponding indicator. The calculated set of outcome values are used to identify a recommended one of a number of internet connectivity configurations that are each associated with a characteristic set of outcome values.

19 Claims, 3 Drawing Sheets

(56) References Cited

U.S. PATENT DOCUMENTS 8,370,280 B1 * 2/2013 Lin .......................... G06N 5/04
706/12
8,514,825 B1 * 8/2013 Addepalli ............. H04W 12/03
370/338
10,225,000 B1 * 3/2019 Chowdhury .......... H04W 24/02
10,999,474 B2 * 5/2021 Niimoto ............... H04N 1/4426
11,182,691 B1 * 11/2021 Zhang .................... G06N 20/20
2005/0080821 A1 * 4/2005 Breil ...................... G06Q 40/02
2008/0059383 A1 * 3/2008 Mayernik .............. G06Q 10/04
705/2
2014/0053243 A1 * 2/2014 Walsh ..................... H04L 63/08
726/4
2016/0283869 A1 * 9/2016 Williams ............... G06Q 10/02
2017/0366671 A1 * 12/2017 Chishti ............... H04M 3/5233
2018/0234166 A1 * 8/2018 Peponides ........... H04W 72/046
2019/0138946 A1 * 5/2019 Asher ...................... G06N 5/04
2019/0149517 A1 * 5/2019 Haak ..................... H04L 63/029
726/11
2019/0317952 A1 * 10/2019 Li ....................... G06F 16/2246
2019/0370714 A1 * 12/2019 Liubyvyi ........... G06Q 10/0633
2020/0125942 A1 * 4/2020 Pham ..................... G06N 3/042
2020/0175528 A1 * 6/2020 Bazari ................ G06Q 30/0206
2020/0402013 A1 * 12/2020 Yeung .................... G06N 20/20
2020/0410853 A1 * 12/2020 Akella .............. B60W 60/0027
2021/0125068 A1 * 4/2021 Kim ........................ G06F 18/15
2022/0085878 A1 * 3/2022 Li ............................ G06N 3/08

FOREIGN PATENT DOCUMENTS

CN 112382352 A * 2/2021 ............. G16C 60/00
JP 2002117259 A * 4/2002
WO 2018211488 A1 11/2018

OTHER PUBLICATIONS

Office Action For European Application No. 20199440.7, dated Dec. 21, 2023, 6 Pages.
European Search Report issued in Application No. 20199440.7, dated Feb. 4, 2021.
International Search Report and Written Opinion issued in Application No. PCT/EP2021/076874, mailed Jan. 21, 2022.
Examination Report issued in Indian patent application No. 202317028748, dated Aug. 18, 2025.

* cited by examiner

METHOD AND SYSTEM FOR IDENTIFYING AN OPTIMISED INTERNET CONNECTIVITY CONFIGURATION

CROSS-REFERENCE TO RELATED APPLICATIONS

This application is a national stage application, filed under 35 U.S.C. § 371, of International Patent Application No. PCT/EP2021/076874, filed on Sep. 29, 2021 and entitled "METHOD AND SYSTEM FOR IDENTIFYING AN OPTIMISED INTERNET CONNECTIVITY CONFIGURATION," which claims the benefit of and priority of European Application No. 20199440.7, filed Sep. 30, 2020 and entitled "METHOD AND SYSTEM FOR IDENTIFYING AN OPTIMISED INTERNET CONNECTIVITY CONFIGURATION," which are incorporated by reference herein in their entirety.

TECHNICAL FIELD

This invention relates to the field of predicting the bandwidth requirements of an internet service provided to a user during a journey.

BACKGROUND OF THE INVENTION

Modern aircraft are equipped with In-Flight Connectivity (IFC) systems to enable passengers to remain connected and communicate with the outside world during their journey, thereby providing an enhanced customer experience.

A number of different factors affect the demand for in-flight internet access and, as a result, the amount of broadband provided by an IFC system will vary considerably across different flights, even for flights on the same route. For example, the demand for internet access on overnight flights will typically be less than daytime flights, and flights with a large proportion of business travellers will also typically have a higher demand for internet access. The factors that affect the demand for in-flight internet access may include (but not be limited to): the flight schedule and duration; the time of year of the flight; the aircraft size and aircraft type; the type of satellite technology providing connectivity; and the relative passenger load factor. These factors make it effectively impossible to accurately forecast or prediction of demand for internet access on a particular flight using conventional statistics.

The amount of bandwidth provided by an airline on a flight cannot be easily adjusted mid-flight. This is because the bandwidth available is determined by a number of immutable factors such as the satellite communication (satcom) technology, the contract negotiated with the satellite provider (CAT-package), and the local coverage quality of the satellite provider. Accordingly, failing to accurately predict the demand for IFC services in advance can lead to providing an inadequate amount of bandwidth for a particular flight, which is inefficient and not cost effective for airlines and inconvenient for customers.

However, at the moment, airlines cannot accurately predict an appropriate amount of bandwidth to provide to passengers during a particular flight, especially for new flight routes. This is because airlines do not have access to sufficient historical data to analyse passenger behaviour patterns and flight conditions of IFC systems when in use. Instead, airlines typically use one of the following methods to estimate an anticipated demand for internet access during a particular flight. First, airlines estimate the demand for internet access, and implement IFC systems that provide internet access based on those estimations. Typically, the airline will not use any means to simulate or predict the outcome of the estimated demand. Second, airlines may have access to some historical data and use that data to inform decision making, however the airline is unable to access data from other airlines. This leads to an incomplete picture and can prevent airlines from making decisions that provide the most efficient and cost-effective outcome, especially in regions where there are new flight routes or where passenger behaviours are particularly distinct. Third, airlines may have access to historical data but lack the means to efficiently analyse such an extensive quantity of data. This results in airlines spending a disproportionate amount of time analysing data to identify cost-effective solutions.

SUMMARY OF INVENTION

The invention is defined by the independent claims, to which reference should now be made. Preferred features are laid out in the dependent claims.

According to a first aspect of the invention, there is provided a computer implemented method for training a machine learning model to identify an optimised internet connectivity configuration for an internet service provided to a user during a journey, the method comprising: receiving data from a plurality of data sources, processing the received data with a processing module, generating a plurality of features from the processed data, creating a machine learning model using a first subset of the received data, the machine learning model comprising a first predictive model built using a first subset of features that are associated with the number of users of the internet service, a second predictive model built using a second subset of features that are associated with the internet data usage of the internet service, and a third predictive model built using a third subset of features that are associated with the relative bandwidth saturation of the internet service, calculating a first plurality of outcome values associated with the first subset of the received data by processing the first subset of received data with each predictive model of the machine learning model, wherein a first outcome value is provided by the first predictive model, a second outcome value is provided by the second predictive model, and a third outcome value is provided by the third predictive model, and comparing the first plurality of outcome values with the actual values of the first subset of the received data to determine the accuracy of the machine learning model.

Embodiments of the invention further comprise: calculating a second plurality of outcome values associated with a second subset of the received data by processing the second subset of received data with each predictive model of the machine learning model, comparing the second plurality of outcome values with the actual values of the second subset of the received data to determine the accuracy of the machine learning model, and adjusting one or more of the first, second and third predictive models if the comparison is greater than a threshold value.

Embodiments of the invention further comprise: calculating a third plurality of outcome values associated with a third subset of the received data by processing the third subset of received data with each predictive model of the machine learning model, and comparing the third plurality of outcome values with the actual values of the third subset of the received data to determine the accuracy of the machine learning model.

In further embodiments of the invention, one or more of the first, second and third predictive models are adjusted by changing one or more hyper-parameters of the respective predictive model and retaining the hyper-parameters that provide the most accurate outcome values.

In further embodiments of the invention, calculating one or more of the plurality of outcome values comprises using an algorithm to calculate a set of weighting factors to apply to the subset of features associated with the corresponding one or more of the plurality of outcome values.

In further embodiments of the invention, each predictive model comprises one or more of a Random Forest algorithm, a Neural Network algorithm, a ridge regression algorithm, a Generalized Linear Model using a quasi-Poisson distribution, and/or a Gradient Boosting Machine algorithm.

In further embodiments of the invention, calculating the first or second plurality of outcome values further comprises processing the first, second and third outcome values using one or more stacked learning models.

In further embodiments of the invention, the threshold value corresponds to a percentage error between an outcome value and the corresponding actual value being 10%, 5%, or 1%.

In further embodiments of the invention, the first, second and third subsets are different.

In further embodiments of the invention, the first subset of the received data comprises substantially 70% of the processed data, the second subset of the received data comprises substantially 20% of the processed data, and the third subset of the received data comprises substantially 10% of the processed data.

In further embodiments of the invention, processing the received data comprises one or more of cleaning, combining and aggregating the received data.

In further embodiments of the invention, the received data comprises aircraft-related data, flight data and historical in-flight internet connectivity data In further embodiments of the invention, the aircraft-related data comprises information relating to an aircraft type and information relating to the satellite technology used to provide in-flight connectivity, wherein the flight data comprises information relating to the flight, flight schedule, and flight duration, and wherein the historical in-flight internet connectivity data comprises information relating to in-flight internet usage associated with historical flights.

In further embodiments of the invention, the first subset of features are defined by: grouping the processed data according to a flight number and a category associated with each of a plurality of internet access services that enable a user to access the internet service, augmenting the grouped data with data associated with one or more of a departure country, an arrival country, a departure time zone, and an arrival time zone, and determining a number of seats in each seat class and seat class limitations from the received data.

According to a second aspect of the invention, there is provided a computer implemented method for identifying an optimised configuration for an internet service provided to a user during a journey, the method comprising: receiving data associated with the journey, receiving a set of features, wherein each feature affects the one or more outcome values, and calculating a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service, receiving a plurality of internet connectivity configurations for the internet service provided to the user during the journey, wherein each internet connectivity configuration is associated with a characteristic set of outcome values, and identifying one of the plurality of internet connectivity configurations based on the calculated plurality of outcome values.

In further embodiments of the invention, the received data associated with the journey comprises the company providing the journey and user-defined parameters for each of the one or more outcome values.

In further embodiments of the invention, each of the first predictive model, second predictive model and third predictive model are different.

Embodiments of the invention further comprise implementing one or more internet connectivity settings associated with the identified one of the plurality of internet connectivity configurations.

In further embodiments of the invention, each of the plurality of internet connectivity configurations is associated with one or more internet access services that enable the user to access the internet service.

In further embodiments of the invention, implementing the one or more internet connectivity settings comprises creating an instruction to adjust one or more aircraft setting configurations for an in-flight entertainment service, transmitting the instruction to an in-flight connectivity portal, and adjusting the one or more aircraft setting configurations using the in-flight connectivity portal.

In further embodiments of the invention, the one or more internet connectivity settings are implemented for one or more aircraft.

According to a third aspect of the invention, there is provided a system for providing an optimised internet connectivity configuration for an internet service provided to a user during a journey, the system comprising: a processing module configured to process received data, and a processor configured to: receive a set of features, wherein each feature affects the one or more outcome values, and calculate a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service, receive a plurality of internet connectivity configurations for the internet service provided to the user during the journey, wherein each internet connectivity configuration is associated with a characteristic set of outcome values, and identify one of the plurality of internet connectivity configurations based on the calculated plurality of outcome values.

Embodiments of the invention further comprise one or more transmission means for sending instructions containing the identified internet connectivity configuration to an in-flight connectivity portal.

In further embodiments of the invention, the first subset of features includes one or more of: predicted number of users, a satellite communication technology type, a cost associated with each internet access service, the number of internet access services that do not include a cost, the number of internet access services that do include a cost, a data volume limit associated with each internet access service, a time limit associated with each internet access service, a metering type, and the number of flights in each of a plurality of groups, where flights are grouped according to one or more of: the number available internet access services that do not include a cost, the satellite communication technology type, a flight number, a departure month, a departure hour, and an aircraft type.

In further embodiments of the invention, alternatively the first subset of features includes one or more of: a time during the journey where the internet service is available, the total number of seats on a flight, the percentage of flight time spent during the night, a departure month, a country of departure and a country of arrival, a satellite communication technology type, and the number of flights in each of a plurality of groups, where flights are grouped according to one or more of: the availability of at least one internet access service that does not include a cost, the satellite communication technology, a flight number, a departure month, a departure hour, and an aircraft type.

In further embodiments of the invention, the second subset of features includes one or more of: a satellite communication technology type, a cost associated with each internet access service, a time limit associated with each internet access service, and the number of purchases per hour for internet access service.

In further embodiments of the invention, the second subset of features further includes one or more of: a data volume limit associated with each internet access service, and shaping rules, wherein the shaping rules indicate whether an internet access blocking policy is applied.

In further embodiments of the invention, the second subset of the set of features further includes one or more of: a time during the journey where the internet service is available, and shaping rules, wherein the shaping rules indicate whether an internet access blocking policy is applied.

In further embodiments of the invention, the second subset of features further includes the carrier airline associated with a particular flight.

In further embodiments of the invention, the third subset of features includes one or more of: a satellite communication type, an average bitrate associated with each satellite communication type, a percentage of pipe used, an origin airport and a departure airport, and a downlink committed information rate for a Ka-band satellite communication type.

In further embodiments of the invention, the downlink committed information rate for the Ka-band satellite communication type may be 0.75, 1, 2, 3, 4, 5 or 6 Megabytes per second.

According to a fourth aspect of the invention, there is provided a computer program product including a processor configured to execute the steps of any of the first or second aspects of the invention.

According to a fifth aspect of the invention, there is provided a user interface for displaying the computer implemented method of any of the first or second aspects of the invention.

BRIEF DESCRIPTION OF THE DRAWINGS

Embodiments of the invention will now be described, by way of example only, with reference to the accompanying drawings, in which.

DETAILED DESCRIPTION

The following exemplary description is based on a system, apparatus, and method for use in the aviation industry. However, it will be appreciated that the invention may find application outside the aviation industry, including in other transportation industries, or delivery industries where items are transported between locations. For example, embodiments of the invention may be provided on cruise ships that provide internet access for when the cruise ship travels outside the range of terrestrial cellular towers.

Embodiments of the invention solve the problems described above by providing machine learning models that analyse historical data to determine a number of indicators associated with in-flight internet connectivity: first, the adoption of the internet service, i.e. the number of users of the internet service; the volume consumption of the internet service, i.e. the internet data usage of the internet service; and the quality of the browsing experience of the internet service, i.e. the relative bandwidth saturation of the internet service. In addition, embodiments of the invention are able to identify one or more IFC system settings that provide the optimal amount of bandwidth to passengers during a flight based on one or more indicators associated with the flight.

Embodiments of the claimed invention are able to provide the advantages of enabling airlines to save on costs by accurately predicting a demand for internet access for a particular flight and providing a corresponding amount of bandwidth on that particular flight, and accurately predicting the demand for internet access on new flight routes and aircraft types.

System Operation and Overview

Figure 1:
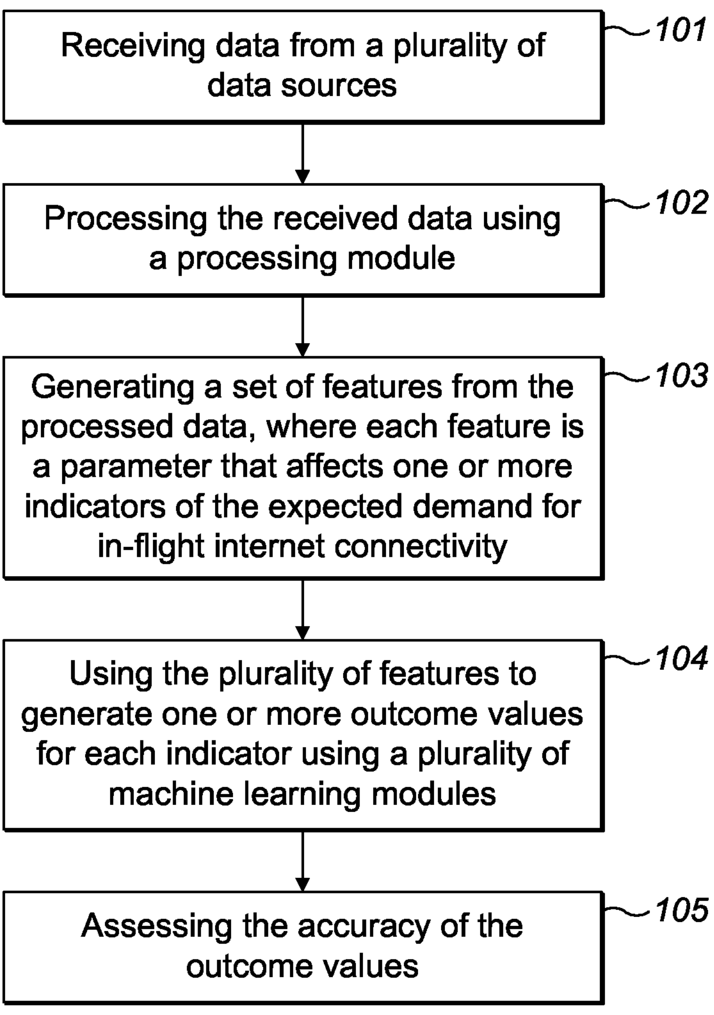
FIG. 1 shows a flow diagram of an example process embodying the invention.

As shown in FIG. 1, in a training phase the system may perform the following steps: receiving data 101 from a plurality of data sources; processing the received data 102 using a processing module to produce an aggregated dataset; processing the aggregated data 103 to generate a plurality of features, where each feature is a parameter that affects one or more metrics associated with in-flight internet connectivity; using the plurality of features to generate 104 one or more outcome values for each indicator using a plurality of machine learning models; and assessing 105 the accuracy of the outcome value. Where necessary, the system may tune one or more of the machine learning models to improve the accuracy of the outcome values. In the context of this application, the accuracy of the outcome values will be understood to mean the relative difference between a known value and a calculated predicted value. For example, in preferred embodiments the accuracy may be determined by calculating a percentage of difference, or percentage error, between the predicted value and the known value.

Figure 2:
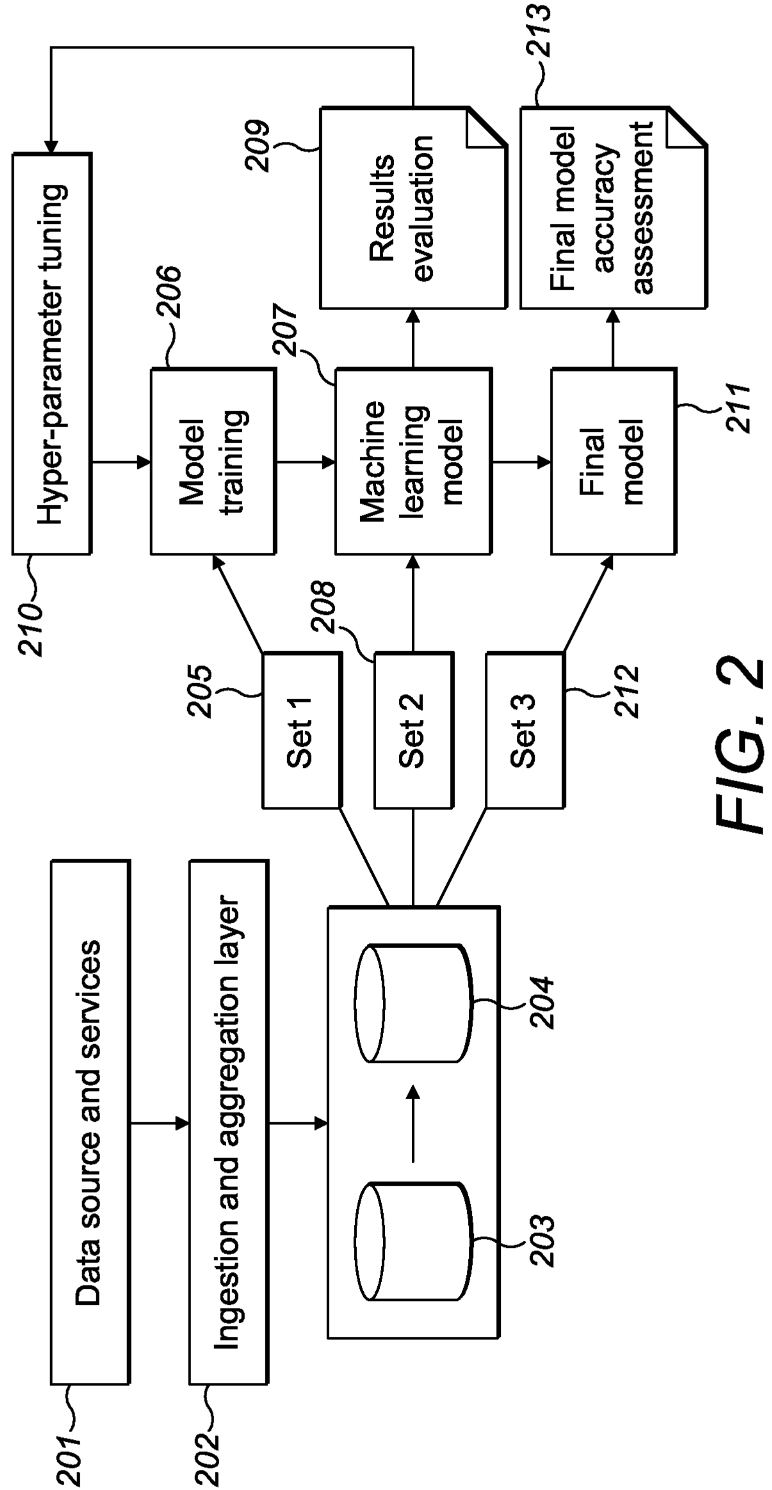
FIG. 2 shows a schematic diagram of the example process of FIG. 1.

This process is shown in more detail in FIG. 2, and further described below. As shown in FIG. 2, in the training phase the system receives data from a plurality of data sources and services 201; processes the received data with a processing module in an ingestion and aggregation layer 202; storing the processed data 203 and generating a plurality of features from the processed data 204; using a first subset of the received data 205 to build and train 206 a machine learning model 207; using a second subset of the received data 208 to test the accuracy of the machine learning model 207 by comparing the results predicted by the machine learning model 207 with the actual values of the second subset of the received data 208 in a results evaluation step 209; if necessary, adjusting the hyperparameters of the machine learning model in a tuning step 210 to improve the accuracy of the machine learning model 207 and to produce a final machine learning model 211; using a third subset of the received data 212 to perform an assessment 213 of the accuracy of the final model by comparing the results predicted by the final machine learning model 211 with the actual values of the third subset of the received data 212.

In preferred embodiments, the system may comprise a second machine learning layer that provides a second set of outcome values based on the outcome values provided by each of the machine learning models in the first machine learning layer for each indicator.

In preferred embodiments, the system may be used to calculated a set of outcome values that predict an estimated demand for, and uptake of, internet connectivity services during a particular flight. The system may recommend or select a particular configuration of internet connectivity settings based on the calculated set of outcome values, thereby advantageously ensuring that an identified flight can be provided with in-flight connectivity services that satisfy the estimated demand. This enables airlines and aircraft to make efficient use of their bandwidth allocations.

Each of the above steps, processes and systems will be further described in turn below.

In a first step 101, the system collects data from a plurality of data sources. In preferred embodiments, the data sources include airline data sources 111 and external data sources 112, and the data derived from these sources may comprise Aircraft Data, Flight Data, and Historical In-Flight Connectivity Data.

thereby indicating the type of satellite that facilitates an internet interaction, for example a particular purchase. In preferred embodiments, the satellite types may correspond to the portions of the electromagnetic spectrum that the satellite uses to communicated. For example, preferred satellite types may be Ku band, L band (such as SwiftBroadband) or Ka band (such as GlobalXpress) satellites.

Aircraft type data indicates the model number or vessel type of each aircraft in an airline fleet. Many aircraft types have several different variants, for example the Boeing 747 has the following aircraft model variants: 747-200; 747-300; 747-400; and 747-81. Aircraft seat data indicates the number of seats that a particular aircraft type or model accommodates. In addition, the same aircraft type can have different numbers of seats, or different configurations of seats for each passenger class, which may vary between airlines or even within the same airline. For example, an airline might have two Airbus A380 aircraft that have the same total number of seats but where one of the aircraft has a higher proportion of Business Class seats than the other aircraft. Aircraft type data and aircraft seat data may be obtained from an external data source, for example the flightera website which may be accessed here:

https://www.flightera.net/en/

Flight Data may include information associated with a particular flight. In preferred embodiments, the Flight Data may include information relating to the flight, flight schedule, and flight duration. For example, the Flight data may comprise: a list of flights; the flight schedule for these flights; information associated with the departure airport and the arrival airport, including the country and region of the airport, the geographic coordinates and timezone of the airport, and the IATA airport code associated with the airport. Flight data may be obtained from an external data source (such as the Openflights website, accessible here: https://openflights.org/).

Flight data may comprise flight leg data, which relates to information associated with the time during which an internet connectivity service is enabled on board an aircraft. The flight leg data may include information relating to the flight, flight schedule, a leg identifier and an aircraft tail number. In some embodiments, the flight leg data may be obtained from an "Operations" database and used as a proxy for flight data if the system is unable to retrieve flight data from the external data source.

Example flight data is shown in Table 1 below.

| Entry ID | Leg ID | Leg Type | Airline | Tail Number | Dept | Arr | Start time | Stop time | Flight number |
|---|---|---|---|---|---|---|---|---|---|
| 9892932 | 9892933 | MVT | UAE | A6-ENA | DXB | LHE | Sep. 9, 2018 10:09 | Sep. 9, 2018 20:40 | UAE622 |
| 9208930 | 9208931 | TGS_NXT | QTR | A7-AHU | EBL | DOH | Feb. 6, 2018 08:42 | Feb. 6, 2018 10:34 | QTR70TV |
| 9215890 | 9215783 | ALNA_NXT | KUW | 9K-APE | AMM | KWI | Mar. 6, 2018 10:03 | Mar. 6, 2018 11:38 | KAC562 |

Aircraft Data may include information relating to an aircraft type and the satellite technology used to provide in-flight connectivity functionality. In preferred embodiments, the Aircraft Data may include data relating to satcom type, aircraft type, and aircraft seat numbers.

Satcom type data indicates the type of satellite that provided internet access to enable a particular transaction or interaction. Accordingly, each item of historical in-flight connectivity data may be associated with a satcom type, The first example entry of Table 1 above shows information relating to a flight taken by Emirates flight UAE622, which departed from Dubai International airport and arrived in Lahore on 9 Sep. 2018. The flight information is uniquely identified by an entry identifier ("9892932") and the flight is uniquely identified by a leg identifier ("9892933").

Historical In-Flight Connectivity Data may include information relating to in-flight internet usage associated with historical flights. In preferred embodiments, the Historical In-Flight Connectivity Data comprises data relating to past adoption rates, volume usage, and Quality of Experience (QoE). For example, Historical In-Flight Connectivity Data may include information relating to purchases and Traffic Management system usage data records (UDR). The Traffic Management system UDR contains information collected every minute in real-time that is relating to the internet network connectivity of one or more IP addresses. For example, the Traffic Management UDR may include an observed Round Trip Time for a particular device while it is connected to an internet connection.

The historical in-flight connectivity data may include purchase data associated with historical transactions made by passengers purchasing one or more products that provide internet access during a flight. Accordingly, in the context of this disclosure, a product will be understood to be a service that provides a user with internet access during a journey. In a specific example, the purchase data includes: a unique transaction identifier; a product identifier; a unique purchasing aircraft identifier, or vessel code, which in preferred embodiments is the unique tail number of the aircraft; the flight number; a flight leg identifier associated with the time of the transaction; and one or more timestamps associated with the purchase.

Example purchase data is shown in Table 2 below.

| Entry ID | product ID | Vessel code | Flight number | Seconds used | Leg ID | Reporting timestamp | Expiration timestamp | Internet Usage Bytes |
|---|---|---|---|---|---|---|---|---|
| 29243632 | 418 | A6-EDX | UAE93P | 7210 | 2883330 | 31 Dec. 2017 20:53 | 1 Jan. 2018 02:01 | 12945377 |
| 29243635 | 188 | HS-TUB | THA910 | 23637 | 2883049 | 31 Dec. 2017 17:55 | 1 Jan. 2018 06:36 | 3271040 |
| 29243636 | 432 | RP-C8782 | PAL685 | 1811 | 2882762 | 31 Dec. 2017 17:05 | 1 Jan. 2018 00:31 | 1301229 |

The first example entry of Table 2 above shows information relating to a purchase made during Emirates flight UAE93P, which occurred on 31 Dec. 2017. The purchase has a product identifier ("418"), which may identify the product as a product that enables the purchaser to access an internet connection during the flight. The purchase data may also indicate the extent to which the purchased product was used. In the first example entry of Table 2, the user accessed the internet for 7210 seconds during the flight and used 12945377 bytes of information. The purchased product includes an expiration timestamp, which in some embodiments will be determined by the time limit associated with the product, and in other embodiments may be the expiration of the flight. The purchase data entry is uniquely identified by an entry identifier ("29243632") and the route that the purchase is made on is uniquely identified by a leg identifier ("2883330").

The historical in-flight connectivity data may also include product data relating to all known products and price plans. In a specific example, the product data includes: a product identifier; a product category identifier, where the product category may be an indication of whether the product is limited in time, data volume, or unlimited; product limitation thresholds, for example the allowable limit of data volume, total time or maximum download speed achievable by the product; a descriptor that describes the product; and the purchase price of a product.

Example product data is shown in Table 3 below.

| Product ID | Product code | Product category | Description | Time limit (minutes) | Byte limit | Cost (GBP) |
|---|---|---|---|---|---|---|
| 7 | ABA_10MB_FULL | VOLUME | 10 MB of internet access | 2880 | 10485760 | 9.99 |
| 5 | FL_FULL | FLIGHT | Full access for whole of flight length | 2880 | NULL | 21.95 |
| 134 | KUW_3_H | TIME | 3 hours of internet access | 180 | NULL | 40 |
| 23 | OA_4MB_FULL | VOLUME | 4 MB of internet access | 2880 | 4194304 | 5.99 |

The first example entry of Table 3 above shows information relating to a first internet connectivity service that enables a user to access the internet. The internet connectivity service may be uniquely identified by a purchase identifier ("7"), and include a product code and descriptor that identifies the details of the internet connectivity service provided by the product. In the above example, the product case the product code "ABA_10 MB_FULL", which indicates that the product enables a user to access the internet during a flight up to a maximum limit of 10 MB of data transfer. In the above example, the product data includes a product category that indicates whether the product is limited by time, data volume, or remains valid for the duration of the flight. Where a product is limited by data volume, the product data may include the limit of how many bytes of data may be transferred before the product expires. Finally, the product data may include an indication of the cost of the product in a particular currency, for example GBP or USD.

In addition to the above, the system may collect business-related data. In preferred embodiments, the business-related data may comprise: price plan route offerings, price plan vessel offerings, and price plan restrictions on seat categories. Price plan route offerings may include particular products that are only available on particular routes. Price plan vessel offerings may include particular products that are only available on particular aircraft types. Not all products may be available on all aircraft types, for example due to improvements in technology on newer aircraft. Price plan restrictions on seat categories may include particular products that are only available for passengers in particular seat classifications.

In addition to the above, the system may collect ancillary data such as information relating to the availability of an internet network provided via satellite link. In preferred embodiments, the ancillary data may comprise: the position and shape of geographical areas where connectivity services are restricted for each satcom type due to regulatory or geo-political reasons, where the restricted areas may be obtained from, for example, a Java code snippet defining the locations of each service restriction rectangle; and the position and shape of a particular satellite beam, which may be obtained from, for example, an export of an external database such as the "myFleet" database.

In a second step 102, the system pre-processes the received data described above to produce an aggregated dataset. The above data may be pre-processed with a processing module, and the pre-processing may comprise cleaning, combining and/or aggregating the data. Pre-processing the data enables the system to obtain data in a consistent, accurate and usable format suitable for further analysis with all relevant and valuable information stored in the same place. For example, the pre-processed data may be in the form of a single table containing all retrieved data. In this context, cleaning data will be understood to mean removing incorrect data entries or partial data to ensure the system is able to operate effectively. Aggregating data in this context means combining data to reduce the size of the dataset overall. For example, data may be aggregated by producing an average value every 15 minutes for a metric that is measured every minute.

In preferred embodiments, the system pre-processes flight data and historical transaction data.

In a specific example, flight data may be aggregated by creating a single table containing all flight data in the following manner. First, the system retrieves flight data that is associated with each of a plurality of flight legs, where each flight leg is associated with an identifier. A flight leg in this context is the period in a flight during which connectivity is enabled on board an aircraft. It will be noted that connectivity in a flight may be provided to either the flight crew in the cockpit, or the passengers in the cabin, or both. The flight data may be retrieved from a database in .csv file format. Next, the system groups flight legs according to the associated flight leg identifier and retains only groups that include at least one leg where connectivity is provided to passengers. The system then defines a "LegDepartureTime" and a "LegArrivalTime" as being the start time and stop time of the entry within the group that has the longest timespan or duration. Finally, the system creates a flights table where each entry corresponds to one unique flight having a flight identifier that is associated with a flight leg identifier, an airline identifier, a unique aircraft tail number, a plurality of timestamps corresponding to a leg start time and a leg stop time, and a flight number.

The data retrieved from external data sources, for example Historical In-Flight Connectivity Data, may be matched to the flight data in the flights table based on a selected flight identifier. This may be achieved by identifying the flight entry in the flights table that includes the same aircraft tail number and for which the interval between the leg departure time and leg arrival time includes the record time of the entry. Once a match is identified, the system assigns the flight identifier associated with the identified flight from the flights table with the corresponding data retrieved from the external data sources. If no matching tail number is found, then a flight identifier of "NA" is assigned to the retrieved data, whereas if the recorded time of the retrieved data does not match with any leg time interval then a flight identifier of "0" is assigned.

Once data from external data sources have been matched to a flight in the flights table, the system augments the flight table with data retrieved from the external data sources. In particular embodiments, the flight table is augmented with aircraft related information, such as aircraft model type, and number of seats in the aircraft, and a satellite communication identifier that indicates the satellite communication type.

In addition to the above, the system may augment the flight data table with calculated data. For example, the system may calculate the total flight volume observed on the ground using the Traffic Management system UDR, and also computing the total flight volume measured on board using Purchases data. In this context, the Flight volume will be understood to mean the total volume of data consumed by passengers during a flight. The system may also calculate an average Round Trip Time (RTT) for the flight using the Traffic Management UDR. In this context, the RTT will be understood to be the duration in milliseconds between a request from a browser and a response from a server. The system may discard entries with fewer than a predefined number of RTT samples. For example, the system may discard entries with fewer than two RTT samples. The system may also calculate the service availability for a particular flight by calculating a percentage of the total flight path where service restrictions do not apply. In preferred embodiments, this calculation may involve: first, for each satcom type, obtaining the geographical coordinates of the boundaries of countries where service restrictions apply; second, for each flight route, determine a route path based on geographical coordinates of the departure and arrival airports, where the route path is calculated to be the shortest segment between the two airports in spherical coordinates; finally, calculate the percentage of the route path that does not cross a restricted airspace over a country where service restrictions apply.

In particular embodiments that obtain connectivity via an L band satellite connection, such as SwiftBroadband, the system may also calculate a number of channel cards for the connection. This is because the maximum bandwidth available for an aircraft via an L band satellite is defined by the number of channel cards installed on board the aircraft. Typically, each channel card is limited to 432 kbit/s. Typically, an aircraft may have 1, 2, or 4 channel cards installed.

Further to the above, in a specific example historical transaction data may be pre-processed by first linking the historical transaction data to product information and flight information, then filtering out superfluous or irrelevant data entries, and finally computing further data based on the historical transaction data.

In a specific embodiment, this may be achieved in the following manner.

First, product information is linked to the historical transaction data by identifying the product identifier associated with each historical purchase and associating corresponding product information that has the same product identifier. Flight information from the aggregated flights table may be associated with the historical transaction data based on, for example, the aircraft tail number or the flight number identified in the historical transaction data.

Next, the system filters out irrelevant data entries. In preferred embodiments this may be achieved by removing purchase data entries associated with a predefined event state identifier value to thereby remove data corresponding to on-going "live" flights. Accordingly, the pre-processed data will only include data entries relating to closed sessions rather than open sessions. The system may also remove historical transaction data entries that do not have a matching product identifier in the database of products that are presently available. The system may also remove historical transaction data entries that do not have a flight number or aircraft tail number that can be found in the Flight Data dataset, or entries having a purchase timestamp that does not match with any leg time interval. In other words, the system removes entries that do not relate to known aircraft and/or entries that are made outside of a known flight schedule.

Finally, the system may calculate further data based on the above. For example, the system may calculate: the local time of departure and arrival based on Flight Data; the flight time at which each historical transaction was made based on the purchase timestamp and the flight start timestamp; the percentage of the flight time at which each historical transaction was made; the number of repeat or supplementary transactions made by the user during the same flight, or with the same airline. In addition, the system may identify the product identifier associated with each repeat or supplementary transaction. In other words, the system identifies the demand for a particular product and how the demand for that product changes during a flight.

In preferred embodiments, the aggregated data is split into three datasets. A first dataset is used as a training dataset to build a first machine learning layer that includes one or more machine learning models. In preferred embodiments, 70% of all the aggregated data is used for the training dataset.

A second dataset is used as a testing dataset to assess the accuracy of the outcomes of the first machine learning layer compared to observed data that were not used to build the first machine learning layer. Based on this assessment, the hyper parameters of the machine learning models may be adjusted as further described below. In preferred embodiments, 20% of all data is used for the testing dataset.

Finally, a third dataset is used as a validation dataset to assess the accuracy of a final set of outcome values that are generated by the adjusted machine learning models as further described below. In preferred embodiments, 10% of all data is used for the validation dataset.

In a third step 103, the system processes the aggregated data to generate a number of features. In preferred embodiments, these features are the parameters that affect a particular indicator of the expected demand for in-flight internet connectivity. Such indicators may include: the estimated adoption rate of a particular internet connection package, the volume of data consumed by users accessing a particular internet connection package, and the quality of experience of an in-flight internet connection. The features associated with each of these indicators will now be described in turn.

In preferred embodiments, the estimated adoption, i.e. a value indicative of the estimated customer demand for a particular product, is calculated by determining the predicted number of transactions for each product.

If a product is free, the predicted number of transactions equals the number of users potentially interested by an internet connection. This is because free products are non-renewable and it is assumed that users select freely available products in preference to products having a cost.

If a product is not free, the predicted number of transactions for each product is based on: the predicted number of potential users; the satellite communication technology; the product price; a volume allowance associated with a product; a time limit associated with a product; the metering type; the number of free plans available during the flight; the number of non-free plans available during the flight; and the number of flights in a particular group, where flights are grouped according to: availability of a free internet connection plan; satellite communication technology; flight; departure month; departure hour; and aircraft type.

Where there is no free product available, the number of potential users on a flight may be calculated based on: the leg time where an internet service is available; the number of seats of a flight; the percentage of flight time spent during the night; the departure month; the country of departure and arrival; the satellite communication technology type; and the number of flights in a particular group, where flights are grouped according to: availability of a free internet connection plan; satellite communication technology; flight; departure month; departure hour; and aircraft type.

The above features may be generated in the following way. First, the system may group the pre-processed purchase data by flight number and by product category. The purchase data may then be augmented with the departure and arrival country and the departure and arrival time zones based on standardised IATA airport codes for the departure and arrival airports. The system may then determine the maximum number of passengers that may access each product. This can be achieved by identifying the number of seats in each seat class (for example, standard, business, or first class) from the flight-related information and applying the corresponding number of seats to each product that is available to that seat class using known seat class limitations from the product data.

In addition, the system may add entries for flights where no users made use of the connectivity packages available (i.e. there were no purchases made) in order to avoid artificially increasing the average adoption of these unused connectivity packages.

In preferred embodiments, the estimated volume of data consumed by users accessing a particular internet connection package during a flight, i.e. a value indicative of the usage of a particular product, is a function of a product category. As indicated above, products may be categorised according to whether the product is limited in time, data volume, relates to particular internet usage limitations (such as being limited to instant messaging only) or is otherwise unlimited. In preferred embodiments, the product categories include: Instant Messaging only products; products limited in data volume only; Products limited in time and data volume; and products that are unlimited.

The set of features used to determine Instant Messaging only products may include: satellite communication technology; the product price; a time limit associated with the product; and the number of regular purchases per hour.

The set of features used to determine products limited in data volume only may include the features for Instant Messaging products above, and further include: a data volume limit associated with the product; and shaping rules, which indicate whether an internet access blocking policy is applied.

The set of features used to determine products limited in both time and data volume may include: satellite communication technology; the product price; a time limit associated with the product; the leg time where an internet service is available; shaping rules, which indicate whether an internet access blocking policy is applied; the carrier airline associated with a particular flight; and the number of regular purchases per hour.

The set of features used to determine products that are unlimited may include: satellite communication technology; the product price; a time limit associated with the product; the leg time where an internet service is available; shaping rules, which indicate whether an internet access blocking policy is applied; and the number of regular purchases per hour.

In a specific example, the system may generate the above features in the following way. First, the system defines a product category for each product. The product category may indicate whether the particular product is one of: an Only Instant Messaging product; and product that is limited in time and data volume; a product that is limited in data volume only; and a product is unlimited in time and data volume. The number of regular purchases may be defined as the number of instances where a consumer accesses a product that is not an Only Instant Messaging. Finally, the system calculates how many regular purchases are made per hour based on the duration of the corresponding flight.

In preferred embodiments, the estimated quality of experience (QoE), i.e. a value indicative of the browsing experience quality that a customer encounters when accessing the internet during a flight, is a function of: an average round trip time (RTT) for the duration of a flight; and the committed information rate (CIR) for the flight.

The set of features used to determine a QoE prediction may include: satellite communication technology; the average bitrate for each satellite communication; the percentage of pipe used (i.e. the proportion of the observed bitrate compared to the total amount of bandwidth that is theoretically available); the flight city pair, i.e. the arrival and departure airports; and a downlink CIR for Global Xpress (i.e. Ka-band satellite communications).

In a specific example, the system may generate the above features in the following way. First, the system determines a plurality of flight routes each flight route being subdivided by a plurality of waypoints along the route. This may be achieved by determining the geographical coordinates for every existing combination of known departure and arrival airports, computing the flight distance between each pair of departure/arrival airports by calculating the length of a line along the surface of a sphere using spherical coordinates (i.e. the flight path), and finally adding waypoints 50 km apart along the calculated flight path and calculate the coordinates of each waypoint.

Each waypoint is then stored in a database along with the following data associated with each flight route: data relating to the departure airport and the arrival airport; the total flight distance; a waypoint identifier that starts at 0 at the departure airport and increases in number along the flight path; the longitude and latitude of the current location of an aircraft on the flight route; the distance of the aircraft from last waypoint; and the percentage of total flight distance already flown by the aircraft.

Each waypoint is assigned a beam associated with a corresponding satellite providing internet connectivity to the aircraft while airborne. Thus, the system may identify which particular satellite is providing internet connectivity to the aircraft at any particular waypoint. This may be achieved by calculating geometric beam shapes and combining with the location data of each waypoint to determine in which beam the waypoint falls within based on the coordinates of the waypoint. If the beams from two satellites overlap for a particular waypoint, the waypoint is duplicated to account for each satellite beam. This is because the aircraft can only ever receive internet connectivity via a single satellite beam, and so duplicating waypoints ensures that the latency experienced by a passenger is attributed to the correct satellite.

Accordingly, each entry to the Traffic Management system UDR may be assigned to a corresponding satellite beam. This may be achieved by using the aggregated flight data to add the departure and arrival airports and times to the Traffic Management system UDR by identifying matching flight identifiers. The system may then calculate, for each entry, the percentage of flight time already passed based on the entry's timestamp, the flight departure time and the flight arrival time. The system may associate each Traffic Management UDR entry with an estimated set of coordinates by assuming equivalence between the percentage flight time elapsed and percentage flight distance elapsed and based on the two closest waypoints of the corresponding flight route. Next, the system may determine in which satellite beam the Traffic Management UDR entry is within based on the estimated coordinates. As described above for waypoints, the entry is ascribed a satellite beam by calculating geometric beam shapes and combining with the location data of each UDR entry to determine in which beam the UDR entry falls within based on the coordinates of the UDR entry. If the beams from two satellites overlap for a particular UDR entry it is duplicated to account for each satellite beam. The system may then group the Traffic Management UDR data according to an associated flight identifier.

Further to the above, the system may calculate the percentage of a total flight time spent in a particular quadrant. In the context of this disclosure, a quadrant will be understood to be a visual categorisation of the QoE based a first threshold defined for the bitrate and a second threshold defined for the latency. Identifying the quadrant in which the QoE is residing enables the system to assess the current state of congestion (i.e. the latency) of the internet network and provides insights of the reason for this state of congestion.

In a first quadrant, where the internet network performance is below the bitrate threshold and below the latency threshold, there is relatively little congestion and relatively little data traffic. In a second quadrant, where the internet network performance is above the bitrate threshold and below the latency threshold, there is relatively little congestion despite a significant level of data traffic. This situation may occur where few users are connected to the internet network, but each of the users consumes a lot of internet data. In a third quadrant, where the internet network performance is below the bitrate threshold and above the latency threshold, there is a significant level of congestion but this is not due to a large volume of data traffic. This situation is sometimes known as beam contention, where the satellite beam may become saturated by traffic coming from other aircraft or boats in the same area. In the fourth quadrant, where the internet network performance is above the bitrate threshold and above the latency threshold, there is a significant level of congestion and is most likely caused by too much data traffic demand for the available bandwidth.

The amount of flight time spent in each of the above quadrants therefore provides an indication of the internet network congestion during a flight and the most likely cause of the congestion. In some embodiments, the quadrant distribution may act as a proxy for the QoE, as the congestion of the internet network has a direct impact on the QoE for a flight.

In particular embodiments, the system establishes thresholds for the data transfer rate and the RTT according to the satellite beam type. For example, in preferred embodiments, if the satellite beam is from an L band satellite the system applies a threshold of 300 kbit/s per channel card to the bitrate and a threshold of 3000 ms to the RTT. If the satellite beam is from a $K_a$ band or $K_u$ band satellite the system may apply a threshold of 1500 ms to the RTT and may apply a threshold of 0.75, 1, 2, 3, 4, 5, or 6 Mbit/s to the bitrate. In some embodiments, the system replicates each flight record for each of a plurality of possible CAT packages and may apply a different bitrate threshold to each CAT package. The system may additionally calculate an average bitrate over the total flight time and computing an average RTT over the flight. The average bitrate for each satellite communication type may be calculated by determining the total volume of data consumed by passengers during a flight based on the pre-processed purchase data, and dividing the total volume by the flight time.

The system may also calculate the percentage of flight time that is spent above either a downlink committed information rate (CIR) or an uplink CIR. In this context, the CIR is an amount of bandwidth that is guaranteed to be available to a user.

The uplink and downlink CIR values may be defined by the satellite communication service provider and, in some embodiments the downlink CIR may be 0.75, 1, 2, 3, 4, 5 or 6 Megabytes per second depending on the particular CAT package provided.

In preferred embodiments, the system repeats the methods described herein for each of a plurality of CIR values except where for where the internet connection is provide via an L-band satellite, which provide a fixed amount of bandwidth per channel card as described above.

The percentage of flight time spent above a downlink CIR may be determined by measuring the total downlink bitrate of an aircraft after every minute during a flight and calculating the number of minutes for which the bitrate was above the downlink CIR. The percentage is then this number of minutes divided by the time during which the service was enabled during the flight. The percentage of flight time spent above an uplink CIR may be determined in the same manner, but comparing the uplink bitrate with an uplink CIR.

Once the system has identified the above features, the features are used to build one or more machine learning models for each respective indicator such that the first machine learning layer is able to produce a set of outcome values. In particular embodiments, a first set of outcome values relate to the demand for a particular product ("adoption"), a second set of outcome values relate to the actual volume of internet data consumed during a flight for each product ("usage"), and a third set of outcome values relate to the quality of service experienced by consumers during their in-flight browsing experience ("quality of experience). These sets of outcome values may be used to predict an estimated demand for internet connectivity services during a flight and to recommend a particular configuration of internet connectivity settings.

In preferred embodiments, the machine learning models may be built to include one of the following known algorithms.

First, outcome values can be determined based on a mathematical formula having weighted variables based on the features above. Algorithms that use mathematical formula include Generalized Linear Models and Ridge Regression. Different algorithms may use different mathematical formulae, for example linear, polynomial, or sinusoidal functions. In a training phase, the machine learning model identifies the weighting coefficients which minimize the error between the predictions of the machine learning model and the actual values of the training dataset.

Second, outcome values can be determined based on decision trees where a question based on the above features acts as a fork, or point of divergence, in the decision tree.

Each subsequent branch, or divergent route, is an answer to that question, and each end leaf, or the termination of a particular divergent route, is a prediction made by the machine learning model. Algorithms that use decision trees include random forests and gradient boosting machines.

The machine learning algorithm identifies the "correct" questions that minimize the error between the predictions of the machine learning model and the actual values of the training dataset.

An illustrative example of a decision tree is provided below:

(fork)Are there more than 300 seats?
- (branch)Yes→(fork)Is the departure month among January, March and November?
  - (branch)Yes→(fork)Is the price plan free?
    - (leaf)Yes→Predict 25 purchases
    - (leaf)No→Predict 3 purchases
  - (branch)No→(fork)Is the percentage of flight time spent during the night above 73%?
    - (leaf) Yes→Predict 12 purchases
    - (leaf)No→Predict 17 purchases
- (branch)No→(fork)Is the legtime below 200 minutes?
  - (branch)Yes→(fork)Is the price plan free?
    - (leaf) Yes→Predict 13 purchases
    - (leaf)No→Predict 2 purchases
  - (branch)No→(fork)Is country of arrival among India, Saudi Arabia, Japan, and France?
    - (leaf) Yes→Predict 12 purchases
    - (leaf)No→Predict 11 purchases Third, outcome values can be determined based on neural networks that comprise a number of interconnected neurons and that are either activated or deactivated depending on the information each neuron receives.

The outcome values may be determined based on the set of neurons that are activated at the termination of a particular calculation.

Finally, outcome values can be determined based on nearest neighbours, where a subset of known data is identified that is determined to be closest (in the sense of Euclidean distance) to a query data value. An outcome value for the query may be determined by identifying the outcome value associated with the known data and calculating the average of those outcome values.

In step 104, the system uses the plurality of features to generate one or more outcome values for each of adoption, usage and quality of experience.

In preferred embodiments, the system generates outcome values for the estimated adoption by determining the predicted number of transactions for each product category.

The number of potential users may be determined by calculating the number of unique internet users on a flight where access to a free internet connection plan is available.

First, from the training dataset, create groups of flights according to each of: availability of a free internet connection plan; satellite communication technology; route; departure month; departure hour; and aircraft type. This may be achieved using the features described above.

For each of the above groups, the system aggregates the features identified above per group of flights to identify: the number of flights in the group; the mean leg time for the flights, including a correction to account for the percentage of flight time spent in airspace areas where internet connectivity is restricted; the mean number of seats in each aircraft; the mean number of unique users of an internet connection during a flight; the departure and arrival countries; and the mean percentage of flight time spent during the night. Aggregating these features advantageously enables the system to save computational resources.

The system then removes the following superfluous or insignificant products: internet connectivity plans with fewer than two days of activity; internet connectivity plans active on fewer than ten flights; internet connectivity plans with fewer than 1000 purchases; any internet connectivity plans that are used for testing purposes; internet connectivity plans that include route and/or aircraft restrictions; internet connectivity plans that are hidden from users when in-flight; and internet connectivity plans that are restricted by seat class or loyalty program.

This results in a list of active free-to-use internet connectivity products with a sufficient amount of associated data. Three products are randomly chosen and retained for validation of the adoption predictor outcome.

The remaining data is split into an adoption training set and an adoption test dataset. In preferred embodiments, 75% of the remaining data is used as the adoption training dataset with the remaining 25% of the data being used as the adoption test dataset. In doing so, the datasets are selected to ensure as much variance between the data as possible.

Each of a plurality of known algorithms are applied to the adoption training dataset to predict the number of unique internet users for a given flight group based on the features calculated above. In some embodiments, the known algorithms may include one or more of: a Generalized Linear Model using a quasi-Poisson distribution; a Random Forest; a Neural Network; and a Gradient Boosting Machine. In preferred embodiments, all four of the above algorithms are used independently.

Each of the one or more algorithms predicts one or more output values for the estimated adoption based on the data in the adoption training dataset. As will be known, each algorithm endeavours to minimize differences between predicted output values calculated from the training dataset and the actual values of the training dataset by dynamically varying a set of intrinsic hyper parameters relating to a particular mathematical optimization formulation. Accordingly, the output values predicted by each algorithm are gathered and compared to the number of actual users. In some embodiments, a second machine learning layer is built using the gathered predictions, as further described below.

The number of transactions made per product category during a flight may be calculated in the following manner.

For free plans, the number of purchases is assumed to be the number of potential users, as outlined above. This is because free plans cannot be renewed and so only a single transaction will be made per product.

For non-free plans, the model calculates: an estimate of the time when each product is available based on purchase data, which indicates which products were available on a particular flight; for each flight, the number of free internet connectivity plans and non-free internet connectivity plans available; and, for each plan, the percentage of purchases made using a promotion code.

The model then removes the following superfluous or insignificant products: internet connectivity plans with fewer than three weeks of activity; any internet connectivity plans that are used for testing purposes; internet connectivity plans that include route and/or aircraft restrictions; internet connectivity plans that are hidden from users when in-flight; internet connectivity plans that are restricted by seat class or loyalty program; and internet connectivity plans that are known to be subjected to regular promotional programmes.

First, from the training dataset, create groups of flights according to each of: product category; satellite communication technology; route; departure month; departure hour; aircraft type; number of free plans available during the flight; and number of non-free plans available during the flight.

For each of the above groups, the system aggregates the features identified above per group of flights to identify: the number of flights in the group; the mean leg time for the flights, including a correction to account for the percentage of flight time spent in airspace areas where internet connectivity is restricted; the mean number of seats in each aircraft; the mean number of unique users of an internet connection during a flight; the departure and arrival countries; the mean percentage of flight time spent during the night; and the mean number of purchases for each product during the flight.

In addition to the number of potential users, as predicted above, the system adds product information, such as product limitations, to the data. Where a product is described as being "unlimited" in a volume or time limit, the system allocates an upper limit of 1000 MB and 1440 minutes respectively.

As described above, three products are randomly chosen and retained for validation of the predicted metric outcome. The data is split into training and testing datasets and one or more algorithms are applied to the training dataset to produce a predicted output value for the number of transactions made per product during a flight. The output values predicted by each algorithm are gathered and compared to the number of actual transactions from the training dataset. A new machine learning model is built using the gathered predictions. In preferred embodiments, the new machine learning model is a stacked model that is built using a Random Forest.

In preferred embodiments, the system generates outcome values for the estimated volume of consumed data by determining the product category. In preferred embodiments, the product categories may relate to: products that provide Instant Messaging only; products that are limited by time and volume; products that are limited in volume only; and products that do not have any limitations.

As indicated above, the volume of consumed data for each of these product categories is a function of the satellite communication technology that is available during a flight. As indicated above, in preferred embodiments satellite technology may be categorised as being a Ku band, an L band or a Ka band.

In particular embodiments, the system determines a value indicative of the data consumption for a first satellite communication technology. For example, the system may determine a data consumption value associated with L-band satellites that indicates the volume of data consumption that may typically be achieved by communicating via L-band satellites. In preferred embodiments, this may be achieved by using a satcom type identifier that is associated with each flight to filter out the flights equipped with L-band satcom communication technology and measure the total internet volume consumed in purchases during those flights. The system may then determine a relative change to the data consumption value in order to determine a value indicative of the data consumption for a second satellite communication technology. For example, the system may identify an average relative difference in data consumption between L-band satellites and Ka- and/or Ku-band satellites.

In particular embodiments, the system determines a value indicative of the data consumption for each product category in a similar manner as described above for producing an adoption predictor. However, for the usage predictor, the system will determine the total data volume consumed during a flight rather than the number of unique users of an internet connection.

As indicated above, the system generates outcome values for the estimated QoE by determining, for each satellite communication type: the flight average Round Trip Time, also known as the latency, which in preferred embodiments acts as a direct proxy for browsing experience quality; the percentage of flight time that is spent above a downlink CIR; the percentage of flight time that is spent above an uplink CIR; the percentage of flight time that is spent above either the downlink or the uplink CIR; and the percentage of flight time that is spent in each of the four quadrants according to the downlink CIR and an RTT threshold that depends on the satellite communication technology (3000 ms for SBB, 1500 ms for KU and GX). These enable the system to predict a browsing experience quality, as well as predicting how well a particular CAT-package, as the internet access provider, is able to satisfy demand for internet access during a flight.

The above are calculated for each satellite communication technology separately, as each satellite technology has different inherent bandwidth and latency.

In preferred embodiments, the system is able to predict, and therefore adapt to, non-linear behaviour of the actual internet connection speed, rather than relying linearly on the average bitrate of the satellite communication technology. This may be achieved by determining an average bitrate predictor, which may include one or more polynomial terms, a square root term, and/or a logarithmic term.

In the following specific example, the system may determine a quality of experience predictor by determining the latency experienced by an aircraft equipped with L-band satellite communication technology. In the example, the system uses a ridge regression algorithm to determine an outcome based on the above features, which are the parameters that directly affect the quality of experience, whereby the features are weighted by one or more coefficients.

In a specific example, the system calculates a quality of experience predictor by determining a latency based on the theoretically available amount of bandwidth that is actually used during the flight. This may be done by determining the coefficients for a $5^{th}$ degree polynomial:

a+bX+cX^2+dX^3+eX^4+fX^5+Y

Where the X is the theoretically available amount of bandwidth that is actually used during the flight and Y is a route correction factor that accounts some flight routes having different latencies than other flight routes. In a specific example for a flight from Dubai International Airport to Munich International Airport, the coefficients and route correction factor indicated above have the following values:

| Coefficient | Value |
| --- | --- |
| a | 0 |
| b | 68.63216 |
| c | −2.028041 |
| d | 0.05574580 |
| e | −0.0006223204 |
| f | 0.000002402797 |
| Y | 2524.223 |

As already described above, the data may be split into a QoE training set and a QoE test dataset whereby 75% of the data may be used as the QoE training dataset and the remaining 25% of the data being used as the QoE test dataset.

Adjusting Machine Learning Models

In step 105, the system assesses the accuracy of the outcome values in a results evaluation step. In preferred embodiments, the accuracy of the model and outcome values may be assessed by comparing the predicted values calculated from the testing dataset to actual values contained in the testing dataset. If the accuracy of a particular model falls below a threshold value, the hyper parameters of the machine learning model may be adjusted in a hyper parameter tuning step to improve the accuracy of the model. In particular embodiments, the threshold value may correspond to a percentage difference, or percentage error between the predicted outcome value and the actual value contained in the testing dataset. In preferred embodiments, the hyper parameter tuning step is performed if the percentage error equals or exceeds 10%, 5%, or 1%.

In some embodiments, The model hyper parameters will vary according to the particular algorithm used in the machine learning model. For example, in specific embodiments involving a neural network the system may adjust the number of layers in the network or the number of neurons per layer. Once the hyper parameters of each model have been adjusted, the accuracy of each model is again assessed against the data of the testing dataset. In preferred embodiments, the system selects the model that has the best accuracy compared to the testing dataset and proceeds with the selected machine learning model. The testing dataset is not used to create the machine learning models or used during the final model accuracy assessment, which is further described below. Preferably, the system tests the accuracy of the final selected machine learning model using the validation dataset. Again, the validation dataset is not used to build or fine tune any of the machine learning models described above.

In preferred embodiments, the system makes use of a second machine learning layer to further improve the accuracy of the predictions made by the system. It is advantageous to include a second machine learning layer because each machine learning algorithm described above may have different prediction accuracies in certain circumstances.

For example, a first algorithm may produce the most accurate results for relatively short flights on aircraft with large number of seats and for flights with more than 70% of the time spent during the day. However, the first algorithm may not be as accurate for relatively long flights with more than 50% spent during the night, which are better modelled using a second algorithm.

Accordingly, providing a second machine learning layer, for example a stacked machine learning model, enables the system to combine the relative strengths of each individual machine learning algorithm and compensate for their relative weaknesses. This may be achieved, for example, by attributing a greater weighting factor to the predictions generated by the most accurate algorithm.

In some embodiments, a plurality of stacked models may be built, with one or more stacked models being associated with each indicator, i.e. adoption rate, volume usage, and QoE.

In preferred embodiments, 10 different stacked models are built, including: one stacked model that is used with predictions for the number of unique users; one stacked model that is used with predications for the number of purchases per product; four stacked models that are used with predictions for usage with L-band satellite communication technology (one per product category); and four stacked models that are used with predictions for the usage increase from L-band to Ka and Ku-band satellite communication technology.

As described above for the first machine learning layer, the stacked model may use any suitable machine learning algorithm. For example, the stacked model may use one or more of a Random Forest, Neural Network, and/or Gradient Boosting Machine algorithms.

Implementation

In preferred embodiments, the outcome values described above enable an airline to identify the impact of different parameters, for example different in-flight internet products or flight routes. For example, the outcome value associated with the estimated volume of consumed data for one or more in-flight internet products on a particular flight route may advantageously indicate how the bandwidth requirements of a particular airline are affected by implementing the in-flight internet products.

In addition, preferred embodiments enable an airline to identify an optimised internet connectivity configuration that provides a desired set of outcome values, for example outcome values that are predefined by the airline. This enables an airline to identify configurations that are predicted to deliver, for example, a reduction in the latency experienced by users even where the expected demand for the internet service is predicted to rise.

Figure 3:
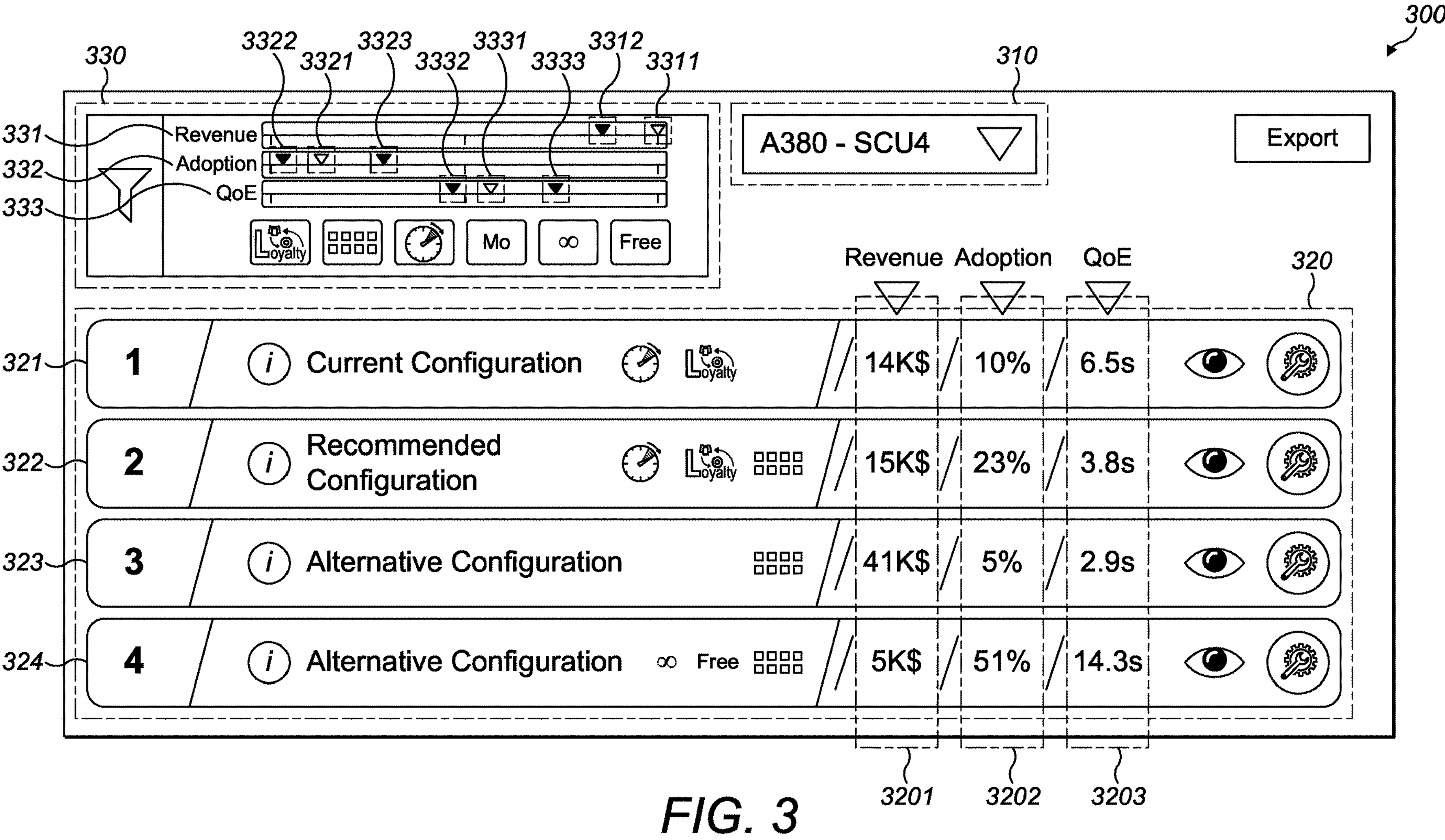
FIG. 3 shows an example user interface of a system embodying the invention.

FIG. 3 shows an example system user interface 300 that may enable an airline to identify an optimised internet connectivity configuration for an in-flight connectivity service. The user interface 300 may include a fleet element 310, an internet connectivity configurations element 320, and an outcome values element 330.

In particular embodiments, for the user interface to display one or more recommended configurations the user must provide the system with one or more of: the airline and one or more user-defined input parameters for each indicator associated with in-flight internet connectivity. The results displayed by the user interface may be filtered by one or more of: the fleet of aircraft, the aircraft platform within that fleet, and any desired price plan characteristics for the products offered during the flight.

The fleet element 310 indicates a fleet of aircraft having the same aircraft model and platform. In the example shown in FIG. 3, the fleet element 310 indicates that the recommended set of configurations has been generated for a fleet of A380 aircraft with an SCU4 platform.

The internet connectivity configurations element 320 may display a comparison of four different internet connectivity configurations: a first internet connectivity configuration 321 that is the configuration currently in use by the airline on the identified fleet, a second internet connectivity configuration 322 that is identified as the optimised internet connectivity configuration based on the input parameters, and third 323 and fourth 324 internet connectivity configurations that are identified as alternative configurations. Each configuration includes an revenue indicia 3201, an adoption indicia 3202, and a quality of experience indicia 3203. The revenue indicia 3201 provides an indication of the predicted revenue generated by one or more products associated with each respective internet connectivity configuration, the adoption indicia 3202 provides an indication of the predicted percentage of passengers who would use the in-flight connectivity service for each internet connectivity configuration, and the quality of experience indicia 3203 provides an indication of the predicted latency associated with each internet connectivity configuration.

The outcome values element 330 may display a revenue display element 331, an adoption display element 332, and a quality of experience display element 333. Each display element includes a number of indicia that indicate the predicted outcome values associated with a selected once of the internet connectivity configurations displayed in element 320. In the example shown in FIG. 3, the second internet connectivity configuration 322 is selected and the outcome values element 330 displays corresponding indicia for the revenue outcome value 3311, adoption outcome value 3321, and QoE outcome value 3331. As indicated above, the revenue display element 331 includes one or more indicia 3312 associated with one or more of the other internet connectivity configurations displayed in element 320, the adoption display element 332 includes one or more indicia 3322, 3323 associated with one or more of the other internet connectivity configurations displayed in element 320, and the quality of experience display element 333 includes one or more indicia 3332, 3333 associated with one or more of the other internet connectivity configurations displayed in element 320.

As already indicated, each internet connectivity configuration may be associated with one or more one or more different products, where each product provides users with internet access and where the different products may include different limitations on the user's internet access. In a specific example, an airline may currently offer a first package of Internet services that comprises three different products ("Package 1"). In this example, Package 1 includes a first product that allows a customer to access the Internet for a limit of either 30 mins or 15 MB, a second product that allows a customer to access the Internet for a limit of either 1 hour or 30 MB, and a third product that allows a customer to access the Internet for either the whole duration of the flight or a limit of 100 MB. In the example, the system may determine that the outcome values for Package 1 would be as follows:

| | |
|---|---|
| Adoption | 9,628 |
| Usage | 464 GB |
| QoE | 2620 ms |

A user of the system could search for a new package of products that improved the adoption of the Internet services while not exceeding an upper threshold for usage, for example 1,000 GB. In the above example, the system might provide a recommended package of Internet services that comprises four different products ("Package 2"). In the example, Package 2 includes a first product that is free of charge and allows a customer to access the Internet for a limit of 1 hour or 20 MB, a second product that allows a customer to access the Internet for a limit of either 2 hours or 50 MB, a third product that allows a customer to access the Internet for a limit of either 4 hours or 100 MB, and a fourth product that allows a customer to access the Internet for either the whole duration of the flight or a limit of 300 MB. In the example, the system may determine that the outcome values for Package 2 are as follows:

| | |
|---|---|
| Adoption | 41,400 |
| Usage | 924 GB |
| QoE | 3223 ms |

In this example, the estimate adoption for Package 2 is in excess of 330% that of Package 1, while ensuring the estimated usage remains below 1,000 GB. However, the estimated latency of Package 2 has increased approximately 23% compared to Package 1.

In preferred embodiments of the present invention, the above outcome values that relate to the adoption, usage or QoE may be used to determine the configuration of aircraft connectivity settings such that the in-flight Internet services provided are optimised. In particular, the system of the claimed invention may be able to identify the configuration of aircraft connectivity settings that makes the most efficient use of an airline's bandwidth allocation. This may be achieved by creating a lookup table that enables a user to identify a shortlist of configurations of aircraft connectivity settings that achieves a predetermined objective for example, maximizing the adoption rate while keeping the data volume usage below 1000 GB and the QoE below 3500 ms.

Once a particular configuration is selected, the existing aircraft connectivity settings may be adjusted for a particular aircraft using an in-flight connectivity portal, which may be a webpage hosted by an airport. This may be achieved manually or automatically. The aircraft connectivity settings may be automatically adjusted by generating an instruction containing the identified internet connectivity configuration and transmitting the instruction to the in-flight connectivity portal using any suitable transmission means. Once received, the configuration of the aircraft connectivity settings may be changed to the identified internet connectivity configuration in a known manner.

From the foregoing, it will be appreciated that the system may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

In addition, the above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

Embodiments of the invention may be described by the following numbered clauses.

1. A computer implemented method for training a machine learning model to identify an optimised internet connectivity configuration for an internet service provided to a user during a journey, the method comprising: receiving data from a plurality of data sources; processing the received data with a processing module; generating a plurality of features from the processed data; creating a machine learning model using a first subset of the received data, the machine learning model comprising a first predictive model built using a first subset of features that are associated with the number of users of the internet service, a second predictive model built using a second subset of features that are associated with the internet data usage of the internet service, and a third predictive model built using a third subset of features that are associated with the relative bandwidth saturation of the internet service; calculating a first plurality of outcome values associated with the first subset of the received data by processing the first subset of received data with each predictive model of the machine learning model, wherein a first outcome value is provided by the first predictive model, a second outcome value is provided by the second predictive model, and a third outcome value is provided by the third predictive model; and comparing the first plurality of outcome values with the actual values of the first subset of the received data to determine the accuracy of the machine learning model.
2. The computer implemented method of clause 1, further comprising: calculating a second plurality of outcome values associated with a second subset of the received data by processing the second subset of received data with each predictive model of the machine learning model; comparing the second plurality of outcome values with the actual values of the second subset of the received data to determine the accuracy of the machine learning model; and adjusting one or more of the first, second and third predictive models if the comparison is greater than a threshold value.
3. The computer implemented method of any preceding clause, further comprising: calculating a third plurality of outcome values associated with a third subset of the received data by processing the third subset of received data with each predictive model of the machine learning model; and comparing the third plurality of outcome values with the actual values of the third subset of the received data to determine the accuracy of the machine learning model.
4. The computer implemented method of clause 1, wherein one or more of the first, second and third predictive models are adjusted by changing one or more hyper-parameters of the respective predictive model and retaining the hyper-parameters that provide the most accurate outcome values.
5. The computer implemented method of clause 1, wherein calculating one or more of the plurality of outcome values comprises using an algorithm to calculate a set of weighting factors to apply to the subset of features associated with the corresponding one or more of the plurality of outcome values.
6. The computer implemented method of clause 1, wherein each predictive model comprises one or more of a Random Forest algorithm, a Neural Network algorithm, a ridge regression algorithm, a Generalized Linear Model using a quasi-Poisson distribution, and/or a Gradient Boosting Machine algorithm.
7. The computer implemented method of any preceding clause, wherein calculating the first or second plurality of outcome values further comprises processing the first, second and third outcome values using one or more stacked learning models.
8. The computer implemented method of any preceding clause, wherein the threshold value corresponds to a percentage error between an outcome value and the corresponding actual value being 10%, 5%, or 1%.
9. The computer implemented method of any preceding clause, wherein the first, second and third subsets are different.
10. The computer implemented method of clause 9, wherein the first subset of the received data comprises substantially 70% of the processed data, the second subset of the received data comprises substantially 20% of the processed data, and the third subset of the received data comprises substantially 10% of the processed data.
11. The computer implemented method of clause 1, wherein processing the received data comprises one or more of cleaning, combining and aggregating the received data.
12. The computer implemented method of clause 1, wherein the received data comprises aircraft-related data, flight data and historical in-flight internet connectivity data
13. The computer implemented method of clause 12, wherein the aircraft-related data comprises information relating to an aircraft type and information relating to the satellite technology used to provide in-flight connectivity, wherein the flight data comprises information relating to the flight, flight schedule, and flight duration, and wherein the historical in-flight internet connectivity data comprises information relating to in-flight internet usage associated with historical flights.
14. The computer implemented method of clause 1, wherein the first subset of features are defined by: grouping the processed data according to a flight number and a category associated with each of a plurality of internet access services that enable a user to access the internet service; augmenting the grouped data with data associated with one or more of a departure country, an arrival country, a departure time zone, and an arrival time zone; and determining a number of seats in each seat class and seat class limitations from the received data.
15. A computer implemented method for identifying an optimised configuration for an internet service provided to a user during a journey, the method comprising: receiving data associated with the journey; receiving a set of features, wherein each feature affects the one or more outcome values; and calculating a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service; receiving a plurality of internet connectivity configurations for the internet service provided to the user during the journey, wherein each internet connectivity configuration is associated with a characteristic set of outcome values; and identifying one of the plurality of internet connectivity configurations based on the calculated plurality of outcome values.

16. The computer implemented method of clause 15, wherein the received data associated with the journey comprises the company providing the journey and user-defined parameters for each of the one or more outcome values.

17. The computer implemented method of clause 15, wherein each of the first predictive model, second predictive model and third predictive model are different.

18. The computer implemented method of clause 15, further comprising implementing one or more internet connectivity settings associated with the identified one of the plurality of internet connectivity configurations.

19. The computer implemented method of clause 15, wherein each of the plurality of internet connectivity configurations is associated with one or more internet access services that enable the user to access the internet service.

20. The computer implemented method of clauses 18 or 19, wherein implementing the one or more internet connectivity settings comprises creating an instruction to adjust one or more aircraft setting configurations for an in-flight entertainment service, transmitting the instruction to an in-flight connectivity portal, and adjusting the one or more aircraft setting configurations using the in-flight connectivity portal.

21. The computer implemented method of clause 20, wherein the one or more internet connectivity settings are implemented for one or more aircraft.

22. A system for providing an optimised internet connectivity configuration for an internet service provided to a user during a journey, the system comprising: a processing module configured to process received data; and a processor configured to: receive a set of features, wherein each feature affects the one or more outcome values; and calculate a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service; receive a plurality of internet connectivity configurations for the internet service provided to the user during the journey, wherein each internet connectivity configuration is associated with a characteristic set of outcome values; and identify one of the plurality of internet connectivity configurations based on the calculated plurality of outcome values.

23. The system of clause 22, further comprising one or more transmission means for sending instructions containing the identified internet connectivity configuration to an in-flight connectivity portal.

24. The system or computer implemented method of any preceding clause, wherein the first subset of features includes one or more of: predicted number of users; a satellite communication technology type; a cost associated with each internet access service; the number of internet access services that do not include a cost; the number of internet access services that do include a cost; a data volume limit associated with each internet access service; a time limit associated with each internet access service; a metering type; and the number of flights in each of a plurality of groups, where flights are grouped according to one or more of: the number available internet access services that do not include a cost; the satellite communication technology type; a flight number; a departure month; a departure hour; and an aircraft type.

25. The system or computer implemented method of clause 24, wherein alternatively the first subset of features includes one or more of: a time during the journey where the internet service is available; the total number of seats on a flight; the percentage of flight time spent during the night; a departure month; a country of departure and a country of arrival; a satellite communication technology type; and the number of flights in each of a plurality of groups, where flights are grouped according to one or more of: the availability of at least one internet access service that does not include a cost; the satellite communication technology; a flight number; a departure month; a departure hour; and an aircraft type.

26. The system or computer implemented method of any preceding clause, wherein the second subset of features includes one or more of: a satellite communication technology type; a cost associated with each internet access service; a time limit associated with each internet access service; and the number of purchases per hour for internet access service.

27. The system or computer implemented method of clause 26, wherein the second subset of features further includes one or more of: a data volume limit associated with each internet access service; and shaping rules, wherein the shaping rules indicate whether an internet access blocking policy is applied.

28. The system or computer implemented method of clause 27, wherein the second subset of the set of features further includes one or more of: a time during the journey where the internet service is available; and shaping rules, wherein the shaping rules indicate whether an internet access blocking policy is applied.

29. The system or computer implemented method of clause 28, wherein the second subset of features further includes the carrier airline associated with a particular flight.

30. The system or computer implemented method of any preceding clause, wherein the third subset of features includes one or more of: a satellite communication type; an average bitrate associated with each satellite communication type; a percentage of pipe used; an origin airport and a departure airport; and a downlink committed information rate for a Ka-band satellite communication type.

31. The system or computer implemented method of clause 30, wherein the downlink committed information rate for the Ka-band satellite communication type may be 0.75, 1, 2, 3, 4, 5 or 6 Megabytes per second.

32. A computer program product including a processor configured to execute the steps of any of clauses 1 to 21 and 24 to 31.

33. A user interface for displaying the computer implemented method of any of clauses 1 to 21 and 24 to 31.

The invention claimed is:

1. A computer implemented method for training a machine learning model to identify an optimised internet connectivity configuration for an internet service provided to a user during a journey, the method comprising:

receiving data from a plurality of data sources;

processing the received data with a processing module;

generating a plurality of features from the processed data;

creating a machine learning model using a first subset of the received data, the machine learning model comprising a first predictive model built using a first subset of features that are associated with a number of users of the internet service, a second predictive model built using a second subset of features that are associated with the internet data usage of the internet service, and a third predictive model built using a third subset of features that are associated with the relative bandwidth saturation of the internet service;

calculating a first plurality of outcome values associated with the first subset of the received data by processing the first subset of received data with each predictive model of the machine learning model, wherein a first outcome value is provided by the first predictive model, a second outcome value is provided by the second predictive model, and a third outcome value is provided by the third predictive model, wherein the first subset of features are defined by:

grouping the processed data according to a flight number and a category associated with each of a plurality of internet access services that enable a user to access the internet service;

augmenting the grouped data with data associated with one or more of a departure country, an arrival country, a departure time zone, and an arrival time zone; and determining a number of seats in each seat class and seat class limitations from the received data;

comparing the first plurality of outcome values with the actual values of the first subset of the received data to determine the accuracy of the machine learning model;

calculating a second plurality of outcome values associated with a second subset of the received data by processing the second subset of received data with each predictive model of the machine learning model;

comparing the second plurality of outcome values with the actual values of the second subset of the received data to determine the accuracy of the machine learning model; and adjusting one or more of the first, second and third predictive models if the comparison is greater than a threshold value.

2. The computer implemented method of claim 1, wherein calculating the first or second plurality of outcome values further comprises processing the first, second and third outcome values using one or more stacked learning models, and wherein the threshold value corresponds to a percentage error between an outcome value and the corresponding actual value being 10%, 5%, or 1%.

3. The computer implemented method of claim 1, further comprising:

calculating a third plurality of outcome values associated with a third subset of the received data by processing the third subset of received data with each predictive model of the machine learning model; and comparing the third plurality of outcome values with the actual values of the third subset of the received data to determine the accuracy of the machine learning model.

4. The computer implemented method of claim 1, wherein one or more of the first, second and third predictive models are adjusted by changing one or more hyper-parameters of the respective predictive model and retaining the hyper-parameters that provide the most accurate outcome values.

5. The computer implemented method of claim 1, wherein calculating one or more of the plurality of outcome values comprises using an algorithm to calculate a set of weighting factors to apply to the subset of features associated with the corresponding one or more of the plurality of outcome values.

6. The computer implemented method of claim 1, wherein each predictive model comprises one or more of a Random Forest algorithm, a Neural Network algorithm, a ridge regression algorithm, a Generalized Linear Model using a quasi-Poisson distribution, and/or a Gradient Boosting Machine algorithm.

7. The computer implemented method of claim 1, wherein the first, second and third subsets are different, and wherein the first subset of the received data comprises substantially 70% of the processed data, the second subset of the received data comprises substantially 20% of the processed data, and the third subset of the received data comprises substantially 10% of the processed data.

8. The computer implemented method of claim 1, wherein processing the received data comprises one or more of cleaning, combining and aggregating the received data.

9. A computer implemented method for identifying an optimised configuration for an internet service provided to a user during a journey, the method comprising:

receiving data associated with the journey;

receiving a set of features, wherein each feature affects the one or more outcome values; and calculating a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service, wherein the first subset of features are defined by:

grouping the processed data according to a flight number and a category associated with each of a plurality of internet access services that enable a user to access the internet service;

augmenting the grouped data with data associated with one or more of a departure country, an arrival country, a departure time zone, and an arrival time zone; and determining a number of seats in each seat class and seat class limitations from the received data;

receiving a plurality of internet connectivity configurations for the internet service provided to the user during the journey, wherein each internet connectivity configuration is associated with a characteristic set of outcome values;

identifying one of the plurality of internet connectivity configurations based on the calculated plurality of outcome values;

calculating a second plurality of outcome values associated with a second subset of the received data by processing the second subset of received data with each predictive model of the machine learning model;

comparing the second plurality of outcome values with the actual values of the second subset of the received data to determine the accuracy of the machine learning model; and adjusting one or more of the first, second and third predictive models if the comparison is greater than a threshold value.

10. The computer implemented method of claim 9, further comprising implementing one or more internet connectivity settings associated with the identified one of the plurality of internet connectivity configurations.

11. The computer implemented method of claim 9, further comprising implementing one or more internet connectivity settings associated with the identified one of the plurality of internet connectivity configurations by creating an instruction to adjust one or more aircraft setting configurations for an in-flight entertainment service, transmitting the instruction to an in-flight connectivity portal, and adjusting the one or more aircraft setting configurations using the in-flight connectivity portal.

12. A system for providing an optimised internet connectivity configuration for an internet service provided to a user during a journey, the system comprising:

a processing module configured to process received data; and a processor configured to:

receive a set of features, wherein each feature affects the one or more outcome values; and calculate a plurality of outcome values by determining a first outcome value by processing the received data associated with the journey with a first subset of features using a first predictive model, wherein the first outcome value is associated with the number of users of the internet service, determining a second outcome value by processing the received data associated with the journey with a second subset of features using a second predictive model, wherein the second outcome value is associated with the internet data usage of the internet service, and determining a third outcome value by processing the received data associated with the journey with a third subset of features using a third predictive model, wherein the third outcome value is associated with the relative bandwidth saturation of the internet service, wherein the first subset of features are defined by:

grouping the processed data according to a flight number and a category associated with each of a plurality of internet access services that enable a user to access the internet service;

augmenting the grouped data with data associated with one or more of a departure country, an arrival country, a departure time zone, and an arrival time zone; and determining a number of seats in each seat class and seat class limitations from the received data;

receive a plurality of internet connectivity configurations for the internet service provided to the user during the journey, wherein each internet connectivity configuration is associated with a characteristic set of outcome values; and identify one of the plurality of internet connectivity configurations based on the calculated plurality of outcome values;

calculate a second plurality of outcome values associated with a second subset of the received data by processing the second subset of received data with each predictive model of the machine learning model;

compare the second plurality of outcome values with the actual values of the second subset of the received data to determine the accuracy of the machine learning model; and adjust one or more of the first, second and third predictive models if the comparison is greater than a threshold value.

13. The system of claim 12, further comprising one or more transmission means for sending instructions containing the identified internet connectivity configuration to an in-flight connectivity portal.

14. The system of claim 12, wherein the first subset of features includes one or more of: predicted number of users; a satellite communication technology type; a cost associated with each internet access service; the number of internet access services that do not include a cost; the number of internet access services that do include a cost; a data volume limit associated with each internet access service; a time limit associated with each internet access service; a metering type; and the number of flights in each of a plurality of groups, where flights are grouped according to one or more of: the number available internet access services that do not include a cost; the satellite communication technology type; the flight number; a departure month; a departure hour; and an aircraft type.

15. The system of claim 12, wherein the first subset of features includes one or more of: a time during the journey where the internet service is available; the total number of seats on a flight; the percentage of flight time spent during the night; a departure month; a country of departure and a country of arrival; a satellite communication technology type; and the number of flights in each of a plurality of groups, where flights are grouped according to one or more of: the availability of at least one internet access service that does not include a cost; the satellite communication technology; a flight number; a departure month; a departure hour; and an aircraft type.

16. The system of claim 12, wherein the second subset of features includes one or more of: a satellite communication technology type; a cost associated with each internet access service; a time limit associated with each internet access service; and the number of purchases per hour for internet access service.

17. The system of claim 12, wherein the second subset of features includes one or more of: a data volume limit associated with each internet access service; and shaping rules, wherein the shaping rules indicate whether an internet access blocking policy is applied.

18. The system of claim 12, wherein the second subset of the set of features includes one or more of: a time during the journey where the internet service is available; and shaping rules, wherein the shaping rules indicate whether an internet access blocking policy is applied.

19. The system of claim 12, wherein the second subset of features further the carrier airline associated with a particular flight, preferably wherein the third subset of features includes one or more of: a satellite communication type; an average bitrate associated with each satellite communication type; a percentage of pipe used; an origin airport and a departure airport; and a downlink committed information rate for a Ka-band satellite communication type, preferably wherein the downlink committed information rate for the Ka-band satellite communication type is 0.75, 1, 2, 3, 4, 5 or 6 Megabytes per second.

* * * * *